Sept. 21, 1965  J. W. BURR  3,207,085
RAIL CAR SWITCHING
Filed Feb. 20, 1964  2 Sheets-Sheet 1
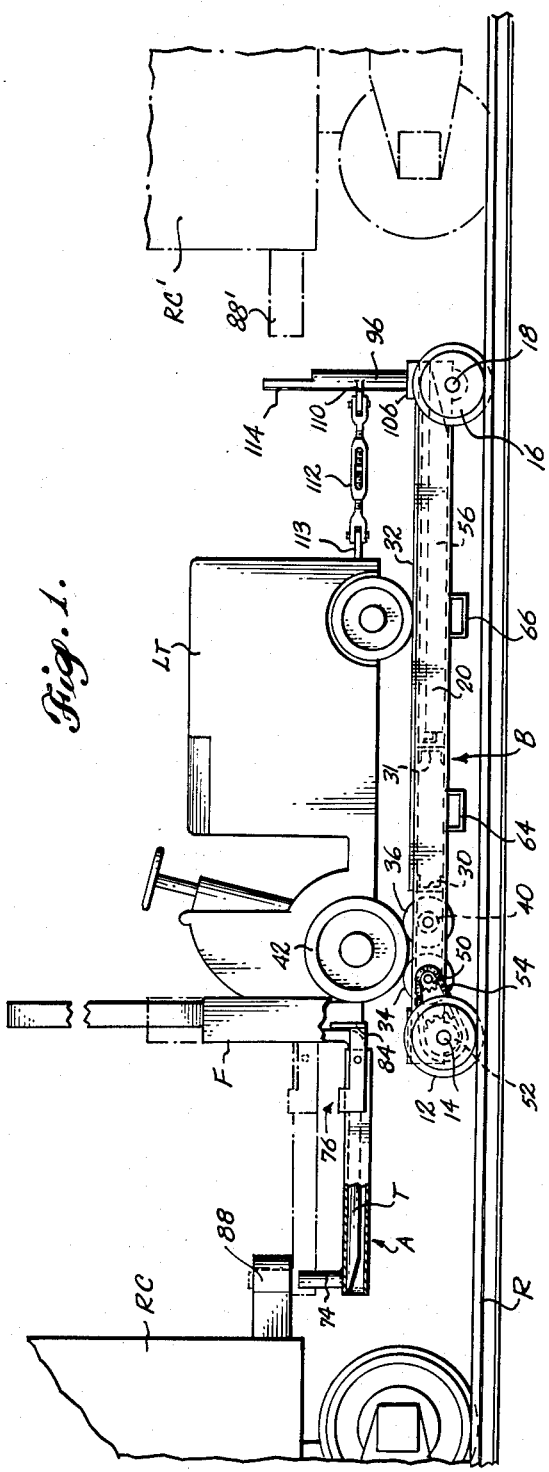
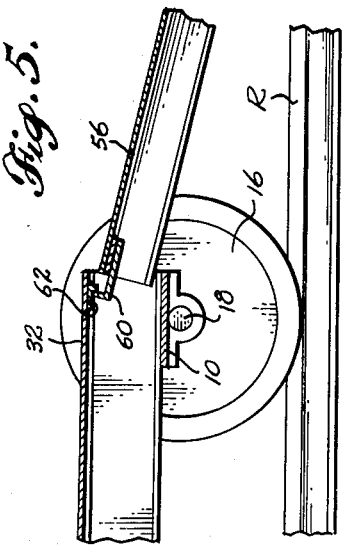
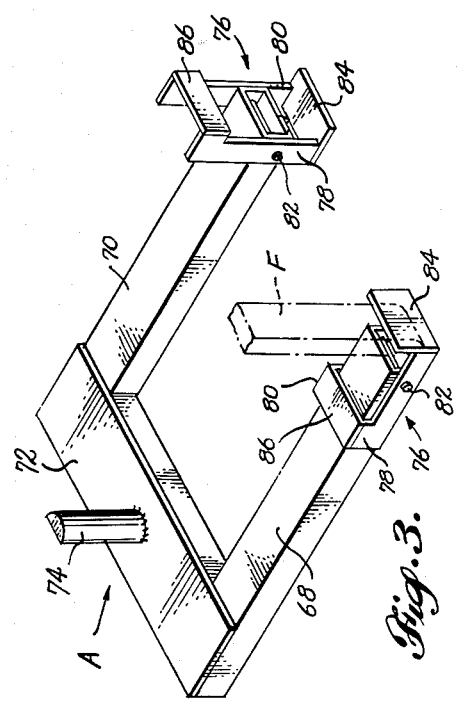
INVENTOR.
JOHN WALTER BURR
BY Mattus & Graybeal
ATTORNEYS Sept. 21, 1965  J. W. BURR  3,207,085
RAIL CAR SWITCHING
Filed Feb. 20, 1964  2 Sheets-Sheet 2
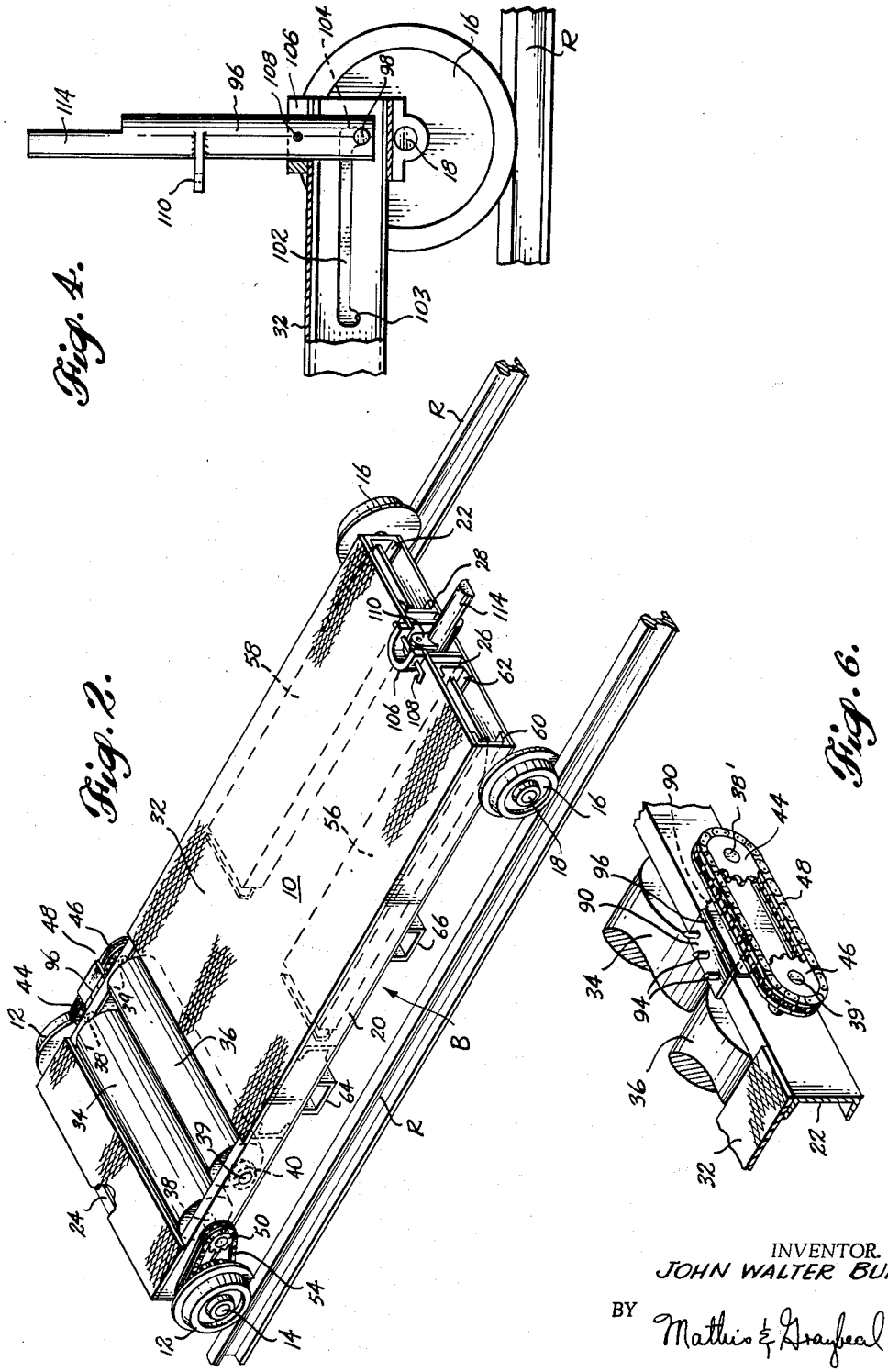
INVENTOR.
JOHN WALTER BURR
BY Mathis & Graybeal
ATTORNEYS

# United States Patent Office 3,207,085
Patented Sept. 21, 1965

3,207,085
RAIL CAR SWITCHING
John Walter Burr, 16660 53rd Ave. S., Seattle, Wash.
Filed Feb. 20, 1964, Ser. No. 346,175
13 Claims. (Cl. 105—26)

The present invention relates to rail car switching, and more particularly to a sub-truck or bogie for adapting a conventional forklift truck for self-powered operation on railroad rails as a minature locomotive to be used as a "switcher." Other aspects of the invention relate to rail car coupling mechanisms and to switching techniques involving the use of the lifting fork mechanism of the bogie supported forklift truck for increasing the load moving capability of the bogie "switcher."

As known in the railroad art, a "switch engine" or "switcher" is a self-powered rail vehicle or locomotive used for moving rail cars into and out of position to be loaded or unloaded at a loading dock or the like. Herein the term "switcher" is used to denote a miniature locomotive constructed according to the invention, and the term "switch engine" is used to denote the larger conventional type locomotive used in switching operations.

Forklift trucks are commonplace at rail car loading docks, as much rail car loading or unloading involves the use of forklift trucks. However, switch engines are less often found on the scene, and for this reason it is necessary to improvise means of switching the rail cars during the absence of the switch engine, to allow for continued cargo handling. In the past forklift trucks have been used in improvised switching techniques. A common practice entails using the forklift truck to tow the rail car by means of a tow chain or cable. This method has proven to be unsafe for both man and machinery and in addition requires that the area around the railway be paved.

A principal object of the present invention is to provide a low, strongly built rail car, herein termed a "bogie," said bogie having wheels adapting same for rail travel, a forklift truck supporting frame including deck means, ramp means for loading and unloading a conventional forklift truck onto or off from said deck means, and a power transmitting mechanism adapted to be frictionally driven by the drive wheels of the forklift truck, and in turn drive certain wheels of the bogie.

According to the invention, a rail car coupling mechanism, or "drawhead adapter," is secured to the forks of the forklift truck and used for coupling onto a rail car to be moved. The bogie is equipped with suitable means for locking the forklift truck into an operating position on the bogie wherein its rubber tire equipped front drive wheels are supported by the mechanism for transmitting the rotary motion of such drive wheels to the wheels of the bogie.

According to the invention, when the operator, who sits on the seat of the forklift truck, desires to move a rail car, he simply maneuvers the bogie switcher into position by driving the forklift truck in the usual manner and couples onto the rail car to be moved. The bogie switcher is then driven in either direction and braked to a stop at will by operation of the forklift truck.

If necessary, the load moving capability of the bogie switcher can be increased by simply applying lift with the forks of the forklift truck, i.e. by lifting up against the drawhead of the rail car. This creates reaction forces which push down on the forklift truck and increase the force normal of its drive wheels on the power transmitting mechanism, and the wheels of the bogie on the rails. Stated another way, the reaction forces increase the traction of the forklift truck drive wheels on the power transmitting mechanism, and the bogie drive wheels on the rails, and such increase in traction enables the switcher to move heavier loads.

When not in use as a component of the bogie switcher, the forklift truck is used for other work in the area. Also, the forklift truck is used for setting the bogie onto and off from the rails. Preferably the bogie includes a pair of receptacles extending crosswise of and subjacent the frame which are adapted to receive the forks of the forklift truck. When not in use the bogie may be stored alongside the rails. Inside storage of the bogie is not essential due to the absence of critical equipment in its makeup which must be protected from the weather.

As will become apparent, owing to the unique construction of the bogie of the present invention, a conventional forklift truck can be quickly and easily driven onto the bogie, into a position on the power transmitting mechanism, and then operated in the usual manner for driving the bogie, without any modification of said forklift truck being required.

Other objects, features and advantages of the present invention involve the provision of a bogie switcher of the character described wherein:

(a) The power transmitting mechanism comprises a pair of spaced apart, generally parallel, transverse drive rollers journaled for rotation on the frame of the bogie, and means drivingly interconnecting said drive rollers with the drive wheels of the bogie;

(b) the bogie frame is formed to include ramp storage compartment means extending generally lengthwise of said bogie, and ramp means storable in said compartment means and adapted to be moved from said compartment means and set into an incline position extending from the ground area behind the bogie up to the upper surface of the frame; and (c) the bogie may include a mechanism disposed at the rear end thereof which is adapted to function both as a means for locking the fork-lift truck into proper operating position on the bogie with its front drive wheels cradled by the transverse drive rollers, and as a rear end rail car coupling mechanism.

A still further object of the present invention is to provide a method of increasing the load moving capability of an engine powered switcher having vertically movable coupler means, a portion of which underlies the drawhead of the rail car to be moved, said method comprising moving said coupler means upwardly against the drawhead of the rail car to be moved, and in that manner creating reaction forces which push down on the switcher and increase the force normal of its wheels on the rails, and driving said switcher on the rails so as to in turn move the rail car.

These and other objects, features, characteristics and advantages pertaining to and inherent in the present invention will be apparent from the following description of certain typical and therefore non-limitative embodiments thereof, as illustrated in the accompanying drawings, wherein like numerals and like letters refer to like parts, and wherein:

FIG. 1 is a side elevational view of a bogie switcher constructed according to the present invention, said view showing a conventional forklift truck supported on the bogie with its front rubber tire equipped drive wheels resting on the drive rollers of the power transmitting mechanism, such view also showing by solid lines the lowered position of the drawhead adapter on the lifting forks, and by broken lines such lifting forks and the drawhead adapter in a position wherein the post portion of such adapter is engaged by the drawhead of the rail car, and the bogie switcher and rail car are coupled together;

FIG. 2 is a perspective view taken from above and toward the rear and one side of the bogie and by broken lines showing the ramp members in an in use position, and also showing the rear anchor-coupling post in its stored position;

FIG. 3 is a perspective view taken from above and towards the rear and one side of the front coupling mechanism or drawhead adapter, such view clearly showing the two positions of the latch mechanisms which serve to lock the drawhead adapter onto the forks of the forklift truck;

FIG. 4 is a fragmentary side elevational view looking toward the rear end portion of the bogie, with parts in section, such view showing the rear anchor-coupling post in its upright, in use position, and the means associated therewith for locking or securing it in such position, and also showing a mounting means for such post which is adapted for permitting such post to be swung rearwardly into a horizontal position and then slid forwardly into a storage compartment disposed between the two ramp storage compartments when it is not in use;

FIG. 5 is also a fragmentary elevational view looking toward the rear end portion of the bogie, such view showing a typical manner of securing the front end of the ramps to the rear end at the bogie frame; and FIG. 6 is a perspective view taken from above and toward the deck and one side of the bogie frame in the vicinity of the drive roller mechanism, such view showing a typical mechanism for preventing movement of the chain which interconnects the drive rollers, and hence movement of the drive rollers themselves, during the times when the forklift truck is being driven into or out of engagement with the drive rollers, such mechanism simply consisting of a pawl, hinged to the frame and adapted to be swung into a position wherein the fingers which it carries enter into the open portions of said chain.

Referring now to the various figures of the drawings more specifically, in FIG. 1 a conventional forklift truck LT is shown in operative position on top of a bogie B constructed according to the invention. Together the lift truck LT and bogie B constitute the "bogie switcher" or "switcher" of the invention.

The bogie B comprises a body or frame 10 suitably supported by front and rear wheel and axle assemblies. The front wheel and axle assembly includes a pair of wheels 12 and an axle 14, and the rear assembly includes a pair of wheels 16 and an axle 18. The wheels 12, 16 are flanged so as to adapt bogie B for travel on rails R. The frame 10 is shown as including a pair of longitudinally extending, side frame members 20, 22 rigidly interconnected at their respective forward ends by a transverse forward frame member 24 (FIG. 2). The frame 10 is illustrated as also including an inboard pair of longitudinal frame members 26, 28, and a pair of auxiliary transverse frame members 30, 31. The frame 10 also includes a steel plate deck 32 preferably equipped with a diamond tread upper surface.

A pair of elongated front and rear drive rollers 34, 36 are disposed forwardly of the deck 32. Such drive rollers 34, 36 are provided with end shafts 38, 38′ and 39, 39′, respectively, which are journaled for rotation in journal boxes 40 carried by the side frame members 20, 22. The drive rollers 34, 36 are disposed rearwardly of the front axle 14 and extend generally parallel thereto. As shown in FIG. 1, for example, the drive rollers 34, 36 extend upwardly slightly above the top of deck 32, and are spaced apart a sufficient distance to enable them to "cradle" the front drive wheels 42 of the forklift truck LT. The surfaces of drive wheels 34, 36 are preferably knurled or otherwise roughened so as to give them a high coefficient of friction and enhance the frictional "grab" of the front drive wheels 42 of the forklift truck LT.

A typical and therefore non-limitative form of apparatus for drivingly connecting the drive rollers 34, 36 to the front wheels 12 of the bogie B is illustrated in FIGS. 1 and 2. Such apparatus includes a first sprocket wheel 44 keyed to or otherwise secured to the shaft 38′ outboardly of side frame member 22. On the same side of bogie B and also outboardly of side frame member 22, a second sprocket 46 of the same diameter as sprocket 44, is secured to the shaft 39′ connected to rear drive roller 36. The sprockets 44, 46, and hence the drive rollers 34, 36, are interconnected by means of a heavy duty roller chain 48, or the like. On the opposite side of the bogie B a sprocket 50 is secured to the portion of shaft 38 which extends through side frame member 20. A somewhat larger sprocket 52 is secured to the inside of the forwardly adjacent bogie wheel 12, or to the axle 14. Sprocket 50, and hence front drive roller 34, are drivingly connected to sprocket 52, and hence bogie wheels 12, by means of another heavy duty roller chain 54, or the like.

According to one aspect of the invention, a pair of loading planks or ramps 56, 58 are slidably received in drawer-like fashion by compartments formed within frame 10 of bogie B. Preferably ramps 56, 58 are provided with upstanding side flanges for holding the wheels of forklift truck LT thereon. As shown in FIG. 2, the compartment for ramp 56 is bounded at its sides by frame members 20, 26, at its top by deck 32, and at its bottom by the lower flange portions 60, 62 of frame members 20, 26. The compartment for ramp 58 is of identical construction but is formed between frame members 22, 28. When not in use the ramp members 56, 58 are slid into and stored in their respective compartments. When it is desired to load the forklift truck LT onto or remove it from bogie B, the ramps 56, 58 are individually slid rearwardly and placed in the inclined position shown in FIGS. 2 and 5. When in an inclined position the ramps 56, 58 are connected at their respective forward ends to the rear end of bogie B by means of hooks 60 which engage and are in turn engaged by hooks 62 secured to the bogie frame 10.

When the bogie B is not in use as a component of the bogie switcher of the present invention, it is set off from the rails R, and when it is desired to again use the bogie B it must be picked up and set back onto the rails R. According to the invention, the forklift truck LT is used for moving the bogie B, and to facilitate such handling a pair of transverse receptacles 64, 66, constructed to receive the tines T of the forklift truck's lifting fork F, are provided subjacent the frame 10. When it is desired to lift and move the bogie B, the forklift truck LT is merely headed toward either side of bogie B, with the tines T at an appropriate level and appropriately aimed, and then driven forwardly until the tines T extend substantially entirely within the receptacles 64, 66. Next the tines T, and the bogie as their load, are raised by suitable operation of the forklift mechanism F, and then the forklift truck LT is driven toward or away from the rails R, depending on the initial position of the bogie B.

FIG. 3 illustrates a typical and therefore non-limitative form of a front end coupling mechanism or drawhead adapter which is adapted to be carried by the tines T of the lifting fork F and used for coupling the bogie switcher to a rail car RC to be moved. The drawhead adapter, designed A in FIG. 3, consists of a pair of substantially parallel box members 68, 70 of elongated form, a cross member 72 bridging between and interconnecting the forward end portions of box members 68, 70, and a sturdy post 74 anchored on and extending vertically upwardly from cross member 72. The box members 68, 70 and cross member 72 may be fabricated from relatively heavy steel plate material with the various components welded together. The rear ends of boxes 68, 70 are open for receiving the tines T of fork mechanism F. A suitable means for securing the drawhead adapter A on the tines T is illustrated in FIGS. 1 and 3. Such means consists of a latch mechanism 76 pivotally connected to the rear end of each box member 68, 70. Each latch mechanism 76 may comprise a pair of side members 78, 80 disposed outboardly on opposite sides of the box member to which it is attached. Each side member 78, 80 is pivotally connected to the adjoining side of its box member by means of a pivot pin 82. A generally rectangular end member 84 bridges between and interconnects one pair of related ends of said side members 78, 80, and a top plate member 86 interconnects the opposite end portions of said side members 78, 80.

In FIG. 3, the latch mechanism 76 connected to box 70 is shown in its open position, wherein its side members 78, 80 extend substantially vertically and the entrance to box 70 is uncovered and unobstructed. The latch mechanism 76 associated with box 68 is shown in a locked position in both FIGS. 3 and 1.

As should be evident, when the tines T of the lifting fork F are fully engaged in boxes 68, 70, the latching mechanisms 76 may be merely rotated in the counter-clockwise direction, as pictured, in order to move the same into locking position, wherein the end plate 84 is disposed rearwardly of the upright portion of a tine T and serves to present the adapter A from moving endwise relative to and off from the tines T.

Assuming now, for example, that the bogie B is in a stored position off of the rails R and it is desired to put it and a conventional forklift truck LT into use, together, as a bogie switcher for moving the rail car RC. The forklift truck is first used to set the bogie B onto the rails R in the previously described manner. Secondly, the drawhead adapter A is engaged by the tines T of lifting fork F. Next, the loading planks or ramps 56, 58 are pulled out and set into the position illustrated in FIG. 2, after which the forklift truck LT is driven up such ramps 56, 58 and onto the frame 10. The drive rollers 34, 36 are restrained against rotation by locking the chain 48, for example, in a manner to be hereinafter described in detail, and the lift truck is driven forwardly until its front drive wheels 42 are nested between and cradled by the rollers 34, 36. The chain 48 is then unlocked, and the ramps 56, 58 are slid back into their receptacles within frame 10. With the drawhead adapter A attached, the bogie switcher is ready to operate.

Since drive chain 54 directly connects roller 34 with the forward wheel and axle assembly of bogie B, the forklift truck must be operated in reverse in order to make the bogie B travel forwardly on the rails R.

In operation, the bogie switcher is moved into position behind the rail car RC by driving the forklift truck LT in the usual manner. In order to couple onto rail car RC the forklift mechanism F may be lowered to a level wherein the post 74 will clear and readily pass under the drawhead 88, and then raised again when post 74 is below the eye of drawhead 88, so as to place such post 74 within such eye. Alternatively, the conventional practice of automatic, impact coupling may be practiced, i.e. the switcher may be driven toward the rail car to be coupled so that the post 74 will forceably enter and operate the pivotal jaw of the drawhead 88 to effect coupling. When coupled, the bogie switcher may be driven in the forward or reverse direction as desired, by the operator sitting in the seat of the forklift truck LT driving the same as he would if traveling on a paved street, for example. As is apparent, the power plant of the forklift truck LT drives the drive wheels 42 of the forklift truck LT, and such drive wheels 42 in turn frictionally drive the two drive rollers 34, 36 of the bogie B. The motion of the drive rollers 34, 36 is then transmitted by the sprocket and chain mechanisms to the front wheel assembly of the bogie B.

In the event that a heavily loaded rail car is to be moved, for example, and the static weight of the forklift truck LT is insufficient to produce the amount of traction of the drive wheels 42 on the rollers 34, 36, or the combined weights of the forklift truck LT and the bogie B are insufficient to cause the traction of the bogie wheels 12 on the rails R, necessary in order for the rail car to be moved, such traction and in turn the load moving capability of the bogie switcher may be increased by merely applying lift against the drawhead 88 with the forklift mechanism F. As the forklift mechanism F is raised, the top surface of cross member 72 presses against the under surface of drawhead 88, and the forklift truck LT responds by bearing downwardly on the bogie B. The lifting creates reaction forces which push down on the forklift truck and increase the force normal of its drive wheels on the power transmitting rollers, and increase the force normal of the wheels 12 of the bogie on the rails R. This increases the traction of the forklift truck drive wheels 42 on the power transmitting rollers 34, 36, and the bogie drive wheels 12 on the rails R, and such increase in traction enables the switcher to move heavier loads.

A typical and therefore non-limitative form of mechanism for holding or preventing movement of rollers 34, 36 during the times when the forward drive wheels 42 of the forklift truck LT are being driven onto or off from the rollers 34, 36 is disclosed in FIGS. 2 and 6. Such mechanism may simply consist of a pawl 90 hinge connected at 92 to the upper edge of frame member 20 slightly inboard of chain 48 and between the sprockets 44, 46. The pawl 90 includes one or more fingers 94 adapted to enter into the open portions of the chain links making up chain 48 when pawl 90 is swung into a position wherein it overlies chain 48. The fingers 94 hold the chain 48 against movement and this in turn prevents movement of the rollers 34, 36. The rollers 34, 36 are freed for rotation by merely prying up on the pawl 90 and then flopping it over onto the top edge surface of side frame member 22. This disengages the fingers 94 from the open portions of the chain links making up chain 48.

FIGS. 1, 2 and 4 illustrate a typical mechanism for preventing movement of the forklift truck LT relative to the bogie B, and hence preventing movement of its drive wheels 42 out of their driving relationship with rollers 34, 36. Such mechanism is also constructed so that it may function as a rear end coupling mechanism. It comprises an elongated post 96 provided at its lower end with a pair of transverse trunnions 98. The trunnions 98 are engaged in a pair of generally parallel, elongated horizontal slots 100 formed in the vertically extending web portions 102 of frame members 26, 28. At their ends the slots 100 are downwardly enlarged so as to form front and rear cradles 103, 104, respectively. The rear end portion of deck 32 is cut away above cradles 104 to receive the post 96 when the same is in its upright, in use position, as shown in FIG. 4, for example. The cut-out area, which is generally U-shaped, is surrounded by a horseshoe metal collar 106, which is typically about three inches (3″) in height and is welded or otherwise secured to the top of deck 32. A pair of transverse openings alignable with complementary openings in post 96 extend through collar 106. A bar or rod 108 is inserted through the said openings in collar 106 and post 96 for securing the post 96 in the upright position. The lower end of post 96 is restrained against movement by virtue of the trunnions 98 being engaged in the rear cradles 104.

Intermediate its length, post 96 is provided with an eye ring 110. A turnbuckle 112 extends between the eye ring 110 and the hitch element 113, located at the rear end of forklift truck LT and constituting a portion of its standard equipment. The turnbuckle 112 is a rigid link between the forklift truck LT and the post 96, which is rigid relative to bogie B. Hence the turnbuckle 112 and the post 96 serve to restrain movement of the forklift truck LT relative to bogie B. Of course, other means such as wheel blocks, guywires, etc. may be used in conjunction with or in place of the post 96 and the turnbuckle 112 for preventing movement of the lift truck LT.

The upper end portion 114 of post 96 is configured to fit within the eye of the drawhead 116 of a rail car RC′, which might be disposed to the rear of the switcher. Coupling is easily effected by merely backing the switcher up until the upper end portion 114 of post 96 is engaged in the drawhead 116.

The space between frame members 26, 28 serves as a storage compartment for the post 96 when it is not in use.

With bar 108 removed from the openings in collar 106 and post 96, the post 96 is free to be swung rearwardly to a horizontal position. When in such horizontal position the forward end of the post 96 is then lifted so as to place the trunions 98 into the straight portions of the slots 100. Next the post 96 is slid forwardly into its storage compartment until the trunnions are received by the cradles 102, which serve to prevent unintentional removal of the post 96 from its storage compartment.

The foregoing is considered as being merely illustrative of the principles of the present invention and not limitative. Since changes, variations, and modifications in the form, construction and the arrangement of the elements shown and described may be made without departing from the spirit of the invention, it is to be understood that the invention is to be limited solely by the scope of the appended claims, rather than by any details of the illustrative showing and foregoing description.

The embodiments of the invention in which an exclusive property or privilege is claimed are defined as follows:

1. A switcher comprising a bogie having wheels adapting same for rail travel; a forklift truck supported on said bogie, said forklift truck having drive wheels, lifting fork means, and engine means for driving the said drive wheels and for operating said lifting fork means; a rail car hitch attachment including means for detachably mounting same onto said lifting fork means, and means for engagement with a rail car coupler; and means drivingly connecting the forklift truck drive wheels with at least some of said bogie wheels.

2. A switcher comprising a bogie having wheels adapting same for rail travel; a forklift truck supported on said bogie, said forklift trucks having front drive wheels equipped with rubber tires and lifting fork means, and engine means for driving said drive wheels and for operating said lifting fork means; a rail car hitch attachment including means for detachably mounting same onto said lifting fork means, and means for engagement with a railway car coupler; power transmitting roller means on said bogie, for cradling and supporting the drive wheels of said forklift truck, and frictionally driven thereby, said power transmitting roller means transmitting the motion of said drive wheels to at least some of the wheels of said bogie.

3. A switcher comprising a bogie having wheels adapting same for rail travel and power transmitting roller means drivingly connected to at least some of said wheels; a forklift truck on said bogie having drive wheels nested in said power transmitting roller means for frictionally driving same, said roller means in turn driving the bogie wheels, said forklift truck also having lifting fork means including a vertically movable fork element, a rail car hitch adapter on said fork element, movable therewith, and engine means for driving said drive wheels and for moving the fork element and the rail car hitch adapter up against the coupler of a rail car for increasing the traction of the drive wheels on the power transmitting roller means and the bogie wheels on the rails.

4. A switcher comprising a forklift truck and a bogie sub-truck adapting said forklift truck for rail travel, said forklift truck having forward drive wheels, said bogie having a frame for supporting said forklift trucks and wheel means adapting said frame for rail travel, said frame having front and rear ends, said bogie further comprising power transmitting roller means on said frame adjacent the front end thereof adapted to receive and support the forward drive wheels of the forklift truck, in a manner so as to be frictionally driven thereby, said roller means being adapted to transmit the motion of the forklift truck drive wheels to the wheel means of said bogie, and runway means including upper surface portions of said frame on which the forklift truck can be driven from a ground position rearwardly of the bogie up onto the bogie, and then forwardly on the bogie until the said forward drive wheels engage the said power transmitting roller means.

5. A switcher according to claim 4, wherein said bogie further includes means for holding the power transmitting roller means against movement when the forklift truck is being moved onto or off from said roller means.

6. A switcher according to claim 4, wherein said bogie further includes ramp storage compartment means extending generally lengthwise thereof in said frame, and ramp means storable in said compartment means and adapted to be moved from said compartment means and set into an inclined position extending from a ground area behind the bogie up to the upper surface of the frame.

7. A switcher according to claim 4, further having a coupling post at the rear of said bogie, a storage compartment for said mounting post in the frame, mounting means for such coupling post permitting movement of the same between a substantially upright in use position to a non-use position in said storage compartment, and means for releasably locking said post in the upright position.

8. In a rail car moving operation involving a rail car having a drawhead and switcher comprising a forklift truck having powered drive wheel means and powered forklift means, a bogie underlying and supporting said forklift truck, and having wheel means adapting same for rail travel, and power transmission means supporting the drive wheels of said forklift truck to be frictionally driven thereby and in turn drive the wheel means of said bogie, and said switcher also including coupler means on the powered forklift means, a method of using the switcher comprising: coupling the coupler means on said forklift means to the drawhead on said rail car, raising said forklift means, and hence the coupler means, upwardly against the drawhead on the rail car, so as to produce reaction forces acting on the forklife truck for increasing both the force normal of the drive wheels of said truck on the power transmission means, to thereby increase the frictional traction between said drive wheel means and the power transmission means, and the force normal of the wheels of said bogie on the rails, to thereby increase the frictional traction between the wheels of said bogie and the rails; and driving said forklift truck to in turn drive the wheels of said bogie along the rails.

9. In combination with a rail car having a drawhead, a switcher comprising a bogie having wheels adapting same for rail travel, a forklift truck supported on said bogie, said forklift truck having drive wheels, lifting fork means, and drive means including engine means for driving the said drive wheels and for operating said lifting fork means, a coupler on said lifting fork means including means for coupling it to said drawhead, and means drivingly connecting the forklift truck drive wheels with at least some of said bogie wheels, so that such bogie wheels may be driven by operation of the engine means of the forklift truck.

10. A bogie for converting a forklift truck into a switcher, said bogie comprising a continuous body of sufficient length to underlie all wheels of the forklift truck, said body including an upper runway surface over which the forklift truck may be driven, from one end of said body substantially to the other end thereof; wheels at each end of said body, adapting it for rail travel; and power transmission means including rotational wheel supporting means for underlying and supporting the drive wheels of the forklift truck in a manner so as to be frictionally rotated thereby, said power transmission means also including means drivingly connecting said rotatable wheel supporting means with at least some of the wheels of said bogie, and with said rotatable wheel supporting means being substantially flush with said upper runway surface, near one end of said body.

11. A bogie according to claim 10, further including releasable lock means for locking said rotatable wheel supporting means against rotation while the forklift truck is being driven into or out from a position wherein its drive wheels are supported on the rotatable wheel supporting means.

12. A bogie according to claim 10, further including ramp storage compartment means extending generally lengthwise of the bogie body, below said runway surface, and ramp means telescopically receivable and storable in said compartment means, said ramp means having first and second ends and including means at the first end for connecting such end to the bogie body when the second end thereof is ground supported and the ramp means is in an inclined position, extending from the ground up to the runway on said bogie body.

13. A bogie according to claim 10, further including socket means extending transversely of the bogie body, below the upper runway surface thereof, said socket means being capable of receiving and accommodating therein the tines of a forklift truck.

References Cited by the Examiner

UNITED STATES PATENTS

| | | | |
|---|---|---|---|
| 2,718,195 | 9/55 | Bock et al. | 105—90 |
| 3,057,306 | 10/62 | Hatfield | 105—159 |
| 3,086,483 | 4/63 | Scheldrug | 105—159 |

ARTHUR L. LA POINT, *Primary Examiner.*

MILTON BUCHLER, *Examiner.*